(12) United States Patent
Steelberg et al.

(10) Patent No.: US 11,048,982 B2
(45) Date of Patent: Jun. 29, 2021

(54) OBJECT DETECTION MACHINE LEARNING

(71) Applicant: Veritone, Inc., Costa Mesa, CA (US)

(72) Inventors: Chad Steelberg, Newport Beach, CA (US); Peter Nguyen, Costa Mesa, CA (US); David Kettler, Bellevue, WA (US); Yu Zhao, Costa Mesa, CA (US)

(*) Notice: Subject to any disclaimer, the term of this patent is extended or adjusted under 35 U.S.C. 154(b) by 0 days.

(21) Appl. No.: 16/581,621

(22) Filed: Sep. 24, 2019

(65) Prior Publication Data

US 2020/0285910 A1 Sep. 10, 2020

Related U.S. Application Data

(60) Provisional application No. 62/735,769, filed on Sep. 24, 2018.

(51) Int. Cl.
*G06K 9/00* (2006.01)
*G06K 9/62* (2006.01)
(Continued)

(52) U.S. Cl.
CPC ....... *G06K 9/6267* (2013.01); *G06K 9/00825* (2013.01); *G06N 3/08* (2013.01);
(Continued)

(58) Field of Classification Search
CPC ............. G06K 9/00825; G06K 9/6227; G06K 9/6267; G06K 9/6292; G06K 9/3241; G06K 9/6231; G06K 9/6257; G06K 2209/09; G06K 9/2054; G06K 9/46; G06K 9/627; B42D 25/23; B42D 25/24; B42D 25/391; G02B 27/28; G02B 5/0816; G02B 5/0841; G02B 5/285; G02B 5/287; G02B 5/30; G02B 5/3041; G02B 5/305; G02B 5/3083; G02F 1/133521; G02F 1/133536; G02F 1/13363; Y10T 428/24942; G06Q 50/26; G06Q 50/265; G06T 11/60; G06T 1/0007; G06T 2207/20021; G06T 2207/20084; G06T 7/0004; G06T 7/001; G06T 7/62;
(Continued)

(56) References Cited

U.S. PATENT DOCUMENTS 9,996,890 B1\* 6/2018 Cinnamon ............. G06K 9/627
2018/0173971 A1\* 6/2018 Jia ........................ G06K 9/6288
(Continued)

*Primary Examiner* — Xin Jia
(74) *Attorney, Agent, or Firm* — One LLP

(57) ABSTRACT

Provided herein are embodiments of systems and methods for classifying one or more objects in an image. One of the methods includes: receiving object classification results of the image from one or more classification engines, the object classification results comprise classification of one or more objects and confidence scores associated with the one or more objects; aggregating the object classification results from the one or more classification engines to generate a list of confidence scores associated with each of the one or more objects, the list of confidence scores comprises one or more confidence scores from one or more classification engines; calculating an overall certainty score for each of the one or more objects based at least on the list of confidence scores; and generating a first orchestrated classification result based the overall certainty score for each of the one or more object.

16 Claims, 13 Drawing Sheets

(51) Int. Cl.
　　　*G06T 7/136*　　　(2017.01)
　　　*G06N 3/08*　　　(2006.01)
　　　*G06T 11/20*　　　(2006.01)
(52) U.S. Cl.
　　　CPC .............. *G06T 7/136* (2017.01); *G06T 11/20* (2013.01); *G06T 2210/12* (2013.01)
(58) Field of Classification Search
　　　CPC ....... G06T 7/73; G06T 11/20; G06T 2210/12; G06T 7/136; B60R 25/09; G01N 23/046; G06N 3/0454; G06N 3/08; G06N 3/0445
　　　See application file for complete search history.

(56) References Cited

U.S. PATENT DOCUMENTS

| | | | |
|---|---|---|---|
| 2018/0322371 A1* | 11/2018 | Dupont De Dinechin | .................. G06K 9/6218 |
| 2018/0365888 A1* | 12/2018 | Satzoda | ............. G06K 9/00791 |
| 2019/0294881 A1* | 9/2019 | Polak | ................... G06K 9/4628 |
| 2019/0392268 A1* | 12/2019 | Tariq | .................. G06K 9/00791 |

\* cited by examiner

| Object | Engine | Bounding Box Location | Class Description | Sub-Class1 Description | Sub-Class2 Description | Sub-Class3 Description | Percent Confidence - Classification Description | Percent Confidence - Sub-Class1 |
|---|---|---|---|---|---|---|---|---|
| bike 115 | First | (x,y);(x,y) | Bicyle | not available | not available | not available | 42% | n/a |
| person 120 | First | (x,y);(x,y) | Person | not available | not available | not available | 87% | n/a |
| vehicle 135 | First | (x,y);(x,y) | Car | 4-Door Hatch | Toyota Prius | not available | 81% | 75% |
| vehicle 145 | First | (x,y);(x,y) | Car | 2-Door Sedan | not available | not available | 65% | 35% |
| vehicle 155 | First | (x,y);(x,y) | Car | Pickup Truck | Toyota Tacoma | not available | 70% | 65% |
| bike 115 | Second | (x,y);(x,y) | Bicyle | not available | not available | not available | 85% | n/a |
| plant 125 | Second | (x,y);(x,y) | Plant | Sage plant | not available | not available | 83% | 70% |
| vehicle 135 | Second | (x,y);(x,y) | Car | 4-Door Hatch | Honda Civic | not available | 65% | 40% |
| vehicle 145 | Second | (x,y);(x,y) | Car | 4-Door Sedan | Honda Civic | not available | 72% | 58% |
| vehicle 155 | Second | (x,y);(x,y) | Car | Pickup Truck | Toyota Tacoma | not available | 80% | 79% |
| vehicle 105 | Third | (x,y);(x,y) | Truck | Pickup Truck | Ford F-150 | Red | 75% | 70% |
| vehicle 110 | Third | (x,y);(x,y) | Truck | Semi | not available | Blue | 60% | 49% |
| plant 125 | Third | (x,y);(x,y) | Plant | not available | not available | purple | 45% | n/a |
| vehicle 135 | Third | (x,y);(x,y) | Car | 4-Door Hatch | Toyota Prius | White | 75% | 70% |
| vehicle 145 | Third | (x,y);(x,y) | Car | 4-Door Sedan | Honda Civic | White | 65% | 65% |
| vehicle 150 | Third | (x,y);(x,y) | Car | Pickup Truck | Ford Ranger | Blue | 67% | 67% |
| vehicle 155 | Third | (x,y);(x,y) | Car | Pickup Truck | Toyota Tacoma | Black | 72% | 72% |

*FIG. 6*

| Object | Number of Instances | Class Description | | Overall Probability |
|---|---|---|---|---|
| | | Highest Probability | Average Probability | |
| vehicle 105 | 1 | 75% | 75.0% | 75.0% |
| vehicle 110 | 1 | 60% | 60.0% | 60.0% |
| bike 115 | 2 | 85% | 63.5% | 85.0% |
| person 120 | 1 | 87% | 87.0% | 87.0% |
| plant 125 | 2 | 83% | 80.5% | 81.0% |
| vehicle 135 | 3 | 81% | 73.7% | 78.0% |
| vehicle 145 | 3 | 72% | 67.3% | 68.5% |
| vehicle 150 | 1 | 67% | 67.0% | 67.0% |
| vehicle 155 | 3 | 80% | 74.0% | 75.5% |

*FIG. 7A*

Sub-Class1 Description 750

| Object | Number of Instances | Highest Probability | Average Probability | Overall Probability |
|---|---|---|---|---|
| vehicle 105 | 1 | 70% | 70.0% | 70.0% |
| vehicle 110 | 1 | 49% | 49.0% | 49.0% |
| bike 115 | 1 | 50% | 50.0% | 50.0% |
| person 120 | 1 | 87% | 87.0% | 87.0% |
| plant 125 | 1 | 70% | 70.0% | 70.0% |
| vehicle 135 | 3 | 75% | 61.7% | 72.5% |
| vehicle 145 | 3 | 67% | 53.3% | 61.5% |
| vehicle 150 | 1 | 67% | 67.0% | 67.0% |
| vehicle 155 | 3 | 79% | 72.0% | 75.5% |

FIG. 7B

| Ground Truth | First Engine | Second Engine | Third Engine | Orchestrated Result |
|---|---|---|---|---|
| vehicle 105 | x | x | detected | detected |
| vehicle 110 | x | x | detected | detected |
| bike 115 | detected | detected | x | detected |
| person 120 | detected | x | x | detected |
| plant 125 | x | detected | detected | detected |
| vehicle 130 | x | x | x | x |
| vehicle 135 | detected | detected | detected | detected |
| vehicle 140 | x | x | x | x |
| vehicle 145 | detected | detected | detected | detected |
| vehicle 150 | x | detected | detected | detected |
| vehicle 155 | detected | detected | detected | detected |
| Total Detection | 45% | 55% | 64% | 82% |

*FIG. 8*

OBJECT DETECTION MACHINE LEARNING

CROSS-REFERENCE TO RELATED APPLICATIONS

The present application claims priority pursuant to 35 U.S.C. § 119(e) to U.S. Provisional Application No. 62/735,769, filed on Sep. 24, 2018, the disclosure of which is incorporated herein by reference in its entirety for all purposes.

BACKGROUND

Based on one estimate, 90% of all data in the world today are generated during the last two years. Quantitively, that is more than 2.5 quintillion bytes of data are being generated every day; and this rate is accelerating. This estimate does not include ephemeral media such as live radio and video broadcasts, most of which are not stored.

To be competitive in the current business climate, businesses should process and analyze big data to discover market trends, customer behaviors, and other useful indicators relating to their markets, product, and/or services. Conventional business intelligence methods traditionally rely on data collected by data warehouses, which is mainly structured data of limited scope (e.g., data collected from surveys and at point of sales). As such, businesses must explore big data (e.g., structured, unstructured, and semi-structured data) to gain a better understanding of their markets and customers. However, gathering, processing, and analyzing big data is a tremendous task to take on for any corporation.

Additionally, it is estimated that about 80% of the world data is unreadable by machines. Ignoring this large portion of unreadable data could potentially mean ignoring 80% of the additional data points. Accordingly, to conduct proper business intelligence studies, businesses need a way to collect, process, and analyze big data, including machine unreadable data, images, and videos.

SUMMARY

Provided herein are embodiments of systems and methods for classifying one or more objects of an image. One of the methods includes: receiving object classification results of the image from one or more classification engines, the object classification results comprise classification of one or more objects and confidence scores associated with the one or more objects; aggregating the object classification results from the one or more classification engines to generate a list of confidence scores associated with each of the one or more objects, the list of confidence scores comprises one or more confidence scores from one or more classification engines; calculating an overall certainty score for each of the one or more objects based at least on the list of confidence scores; and generating a first orchestrated classification result based the overall certainty score for each of the one or more object.

The overall certainty score can comprise a highest confidence score in the list of confidence scores. The overall certainty score can also comprise a number of instances of confidence scores, in the list of confidence scores, that are above a threshold. The overall certainty score can also comprise an overall probability of accuracy of the confidence scores in the list of confidence scores.

The method can further include the following: validating the first orchestrated classification result, using a trained neural network; and generating a second orchestrated classification result based at least in part on the validation of the first orchestrated classification result. The trained neural network can be trained to identify one or more candidate classification engines that have a high probability of classifying a segment of an image accurately.

In the disclosed method, validating the first orchestrated classification result includes: analyzing the image using the trained neural network; segmenting the image into a plurality of segments based at least on the analysis of the image; determining one or more candidate classification engines that are historically accurate in classifying each of the plurality of segments based on one or more attributes of each respective segment; and validating that the overall certainty score for each of the one or more objects is based on one or more classification engines having historically high accuracy.

Validating the first orchestrated classification result can comprise modifying the first orchestrated classification result to generate the second orchestrated classification result based at least on validating that the overall certainty score for each of the one or more objects is based on one or more classification engines having historically high accuracy.

The method can further include: prior to receiving object classification results of the image from one or more classification engines, analyzing the image using a trained neural network; segmenting, by the trained neural network, the image into a plurality of segments based at least on the analysis of the image; determining one or more candidate classification engines that are historically accurate in classifying each of the plurality of segments based on one or more attributes of each respective segment; and sending each of the plurality of segments to a respective classification engine determined to have a historically high accuracy above a predetermined threshold for analysis.

A second method for the classification of objects in an image is also described. The second method includes: determining, using a pre-trained neural network, one or more candidate classification engines that are historically accurate in classifying a plurality of segments of the image based at least on one or more attributes of each segment; requesting a first and second classification engine from the one or more candidate classification engines to classify a first and second segment of the plurality of segments, respectively; and merging classification results received from the first and second classification engines. The one or more attributes can comprise annotation data or pixel data.

A system for classifying objects of an image is also disclosed. The system includes: a memory; and one or more processors coupled to the memory. The one or more processors are configured to: receive object classification results of the image from one or more classification engines, the object classification results comprise classification of one or more objects and confidence scores associated with the one or more objects; aggregate the object classification results from the one or more classification engines to generate a list of confidence scores associated with each of the one or more objects, the list of confidence scores comprises one or more confidence scores from one or more classification engines; calculate an overall certainty score for each of the one or more objects based at least on the list of confidence scores; and generate a first orchestrated classification result based the overall certainty score for each of the one or more object.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 6 illustrates an exemplary result matrix in accordance with some embodiments of the present disclosure.

FIGS. 7A and 7B illustrate exemplary statistical tables of aggregated classification results in accordance with some embodiments of the present disclosure.

FIG. 8 is a table comparing objection classification results from different engine.

Figure 1:
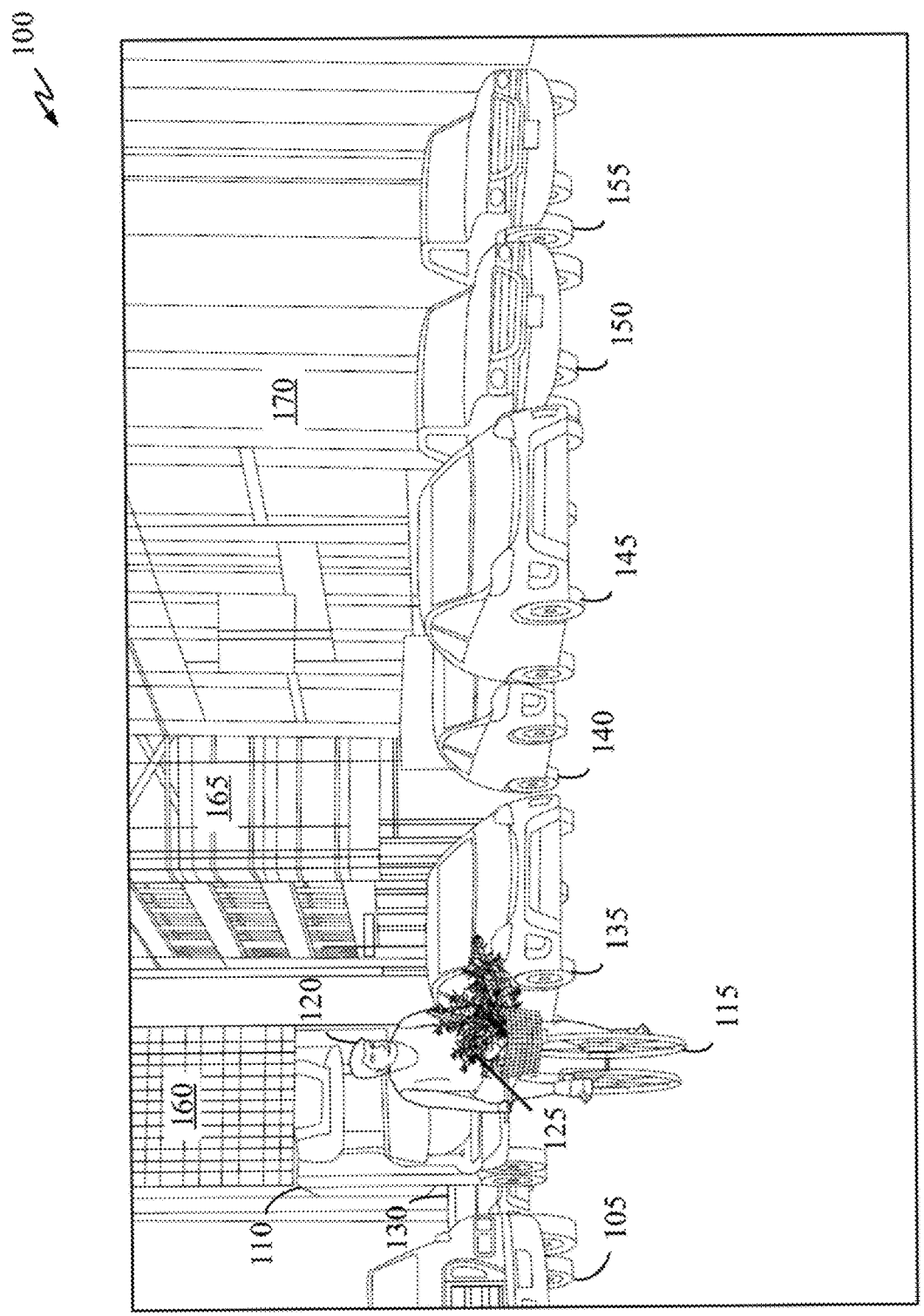
FIG. 1 illustrates an image of a busy intersection.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

At the beginning of the decade (2010), there were only a few available commercial AI engines. Today, there are well over 10,000 AI engines. It is expected that this number will exponentially increase within a few years. With so many commercially available engines, it is almost an impossible task for businesses to choose which engines will perform the best for their type of data. Veritone's AI platform with the conductor and conducted learning technologies make that impossible task practical and efficient.

There are various neural network architectures such as Faster R-CNN, SSD, Mask R-CNN, YOLO, etc. Each neural network architecture has its own strengths and generates unique outputs based on its set of classifiers. A classifier is a learning model that is configured to encode features of an object or an audio waveform on one or more layers, and to classify the object or the audio waveform as outputs. Each neural network contains a set (e.g., collection) of classifiers such as, for example, classifiers for vehicles, bicycles, trees, windows, cats, dogs, birds, etc.

These neural networks (e.g., machine learning) applications are also termed "cognitive engines" and typically address a single area of cognition such as speech transcription and object classification (e.g., object detection and identification). The operation of cognitive engines is coordinated by users through the specification of workflow graphs. These graphs specify the media inputs to process and what cognitive engines to apply. For each cognitive area, users are typically faced with choosing between multiple engines: how many to include, what accuracy is desired, and the cost of running multiple engines.

A machine learning algorithm is an algorithm that learns from data. For example, a computer program is said to learn from experience 'E' with respect to some class of tasks 'T' and performance measure 'P', if its performance at tasks in 'T', as measured by 'P', improves with experience 'E'. Examples of machine learning algorithm may include, but not limited to, a deep learning neural network; a feedforward neural network, a recurrent neural network, a support vector machine learning neural network, and a generative adversarial neural network.

The pace of change and the number of available neural networks can make it extremely difficult for users to keep up-to-date with their workflows. The disclosed conductor and conducted learning technologies improve the useability of the large neural network ecosystem. The neural network selection function of the conductor and conducted technologies is learned using a neural network so that it can be regularly updated without human intervention.

A conductor is a collection of processes (e.g., processes 500, 900, and 1000 described below) that, at least, optimizes the selection of classification engine(s) to classify a given image. The conductor can divide an image into a plurality of segments based on the number of objects detected in the image. One of the functions of the conductor is to perform predictive analytics (using one or more trained machine learning models) to select one or more classification engines that could best classify one of the plurality of segments of the image based on one or more attributes of each segment. The one or more attributes can be image annotation data that can be generated manually or using software such as VGG image annotator, LabelMe, and Computer Vision Annotation Tool. To perform predictive analytics, the pre-trained model is trained to associate engine performance of an engine to image attributes such as VGG image features, which can annotation and pixel data. Thus, given an image segment, the conductor can first determine the image features and attributes such as, but not limited to, pixel data and annotation data. Next, the conductor can use a pre-trained model to predict which image classification engine (from an ecosystem of image classification engines) is a good candidate to correctly classify the image segment.

The image segment can be a portion of an image or an entire image. As noted above, an image can be segmented into a plurality of segments using a first pass to roughly determine the bounding box (e.g., border, outline) of a plurality of objects in the image. Next, the image attributes of each bounding box can be generated, which is used by the conductor to perform predictive analytics.

Annotation data can be metadata associated to a bounding box such as name of an object and/or description of an object. Examples of names of an object are car, cat, dog, hat, truck, flower, and hamburger. Example of the description of an object can be its color, size, shape, texture, action (e.g., running, sleeping), and subjective data (e.g., big, ugly, smelly, aromatic).

Pixel data can be data of one or more pixels such as, but not limited to, intensity, RGB (red, green, and blue) value, and motion vector.

The conductor could then aggregate the classification results from the various classification engines to produce an aggregated classification result based on at least an overall certainty score of each object, which could be one or more of the number of instances an object is detected by all classification engines involved in the analysis; the highest confidence of accuracy; the average confidence of accuracy, or an adjusted confidence of accuracy.

The classification engine (e.g., classification neural network) selection process, as implemented by the conductor, can be applied before and/or after the initial analysis of the media file. For example, prior to running any classification engine, the conductor can determine which classification engine(s) to execute (e.g., analyze the media file) using a trained neural network (e.g., an engine selection neural network). The choice of which classification engines to use can be based on the characteristics (e.g., attributes) of the input media and/or the characteristics of the engines. In object classification, certain classification engines will be able to detect and identify certain objects better such as vehicles and trucks but not bicycles and plants. Accordingly, it can be more efficient and accurate to use the engine selection neural network to identify and use classification engines that are predicted to perform well based on one or more characteristics of the input media (e.g., an image). The engine selection neural network can also be used to identify classification engines to validate classification results received from various classification engines.

FIG. 1 is an example image 100 of a crowded-street intersection that can be used as an input media file for object classification. Ground truth data of FIG. 1 reveal trucks 105 and 110, a bicycle 115, a person 120, a plant 125, and vehicles 130, 135, 140, 145, 150, and 155. Ground truth data of FIG. 1 also show buildings 160, 165, and 170. To simplify the discussion below, the buildings will not be included in the objection classification discussion.

Due to a high incidence of traffic accidents or crimes, there may be a need to perform objection classification of surveillance video of the intersection in image 100. The object classification of the surveillance video can be performed automatically, all objects classified can be recorded to a database. Because of the amount of data involved, it would be impractical to perform the object classification manually since the surveillance video can be hours or days long, which translates to tens of thousands of frames to analyze. Manually generating ground truth data of an image can yield the highest possible accuracy; however, it would be impractical and very expensive to perform the same on a large data set.

Relying on a single classification engine to analyze and classify the surveillance video is also not reliable because the classification errors (e.g., missing object classification, incorrect classification) would be too high. This is because almost all classification engines are designed to classify a very narrow specific class (e.g., animals, vehicles, trucks, plants) well. This leads to classification errors when the image includes a wide variety of classes such as animals, vehicles, trucks, buildings, plants, color, etc.

Figure 2:
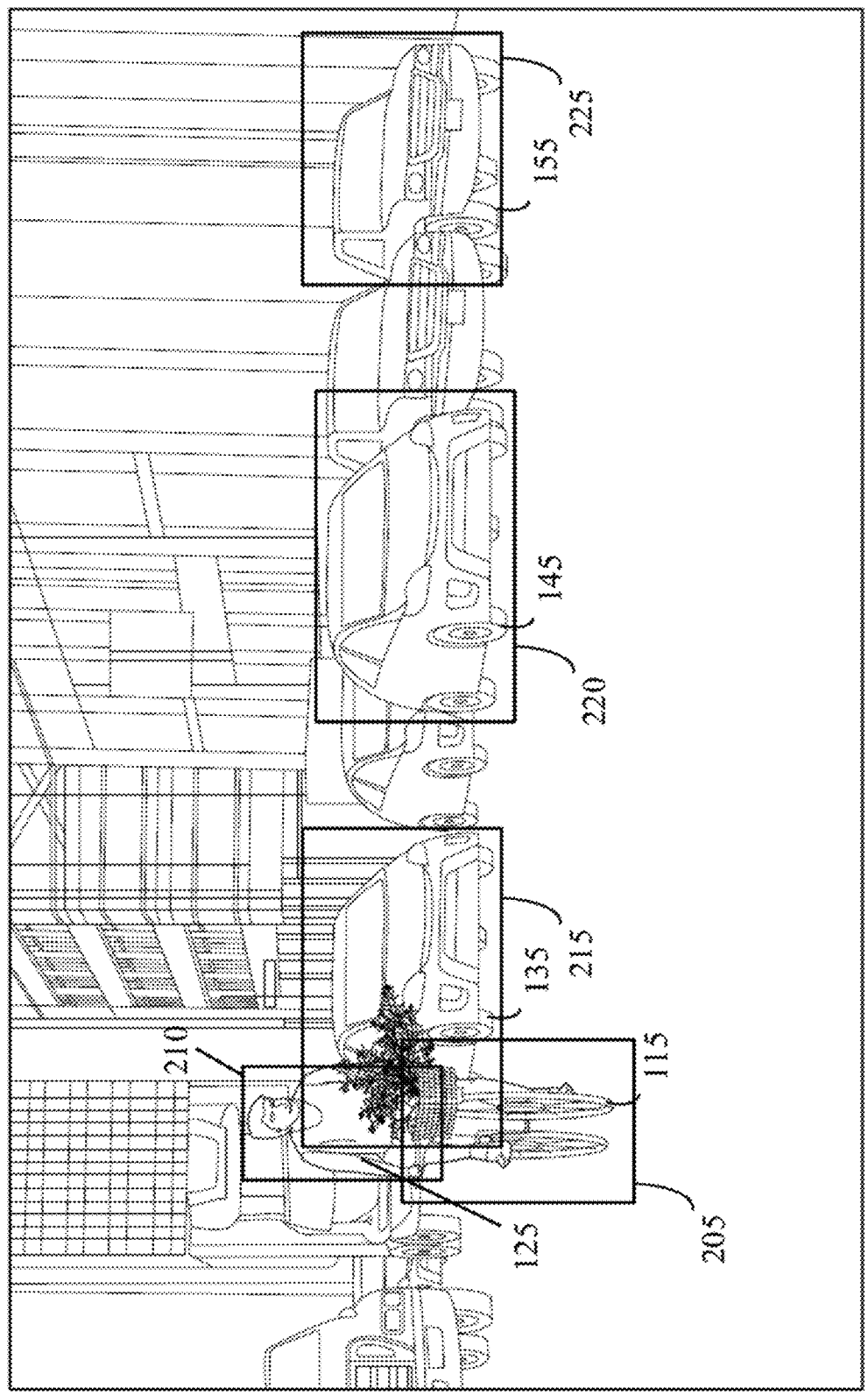
FIGS. 2, 3, and 4 illustrate example object classification results from first, second, and third classification engines, respectively.

FIG. 2 illustrates an example classification result of image 100 received from a first classification engine. As shown in FIG. 2, the first classification engine can detect bicycle 115, person 120, vehicle 135, vehicle 145, and vehicle 155. The classification result can include the boundary information of each detected object. The boundary information can be pixel coordinates of two or more corners of a bounding box of each detected object. For example, in a 5000×10000 pixels image, the coordinates of a bounding box can be represented as [100, 200] (lower left corner), [800, 1400] (upper right corner). Other types of bounding shapes can also be implemented such as circles and polygons. The classification result can also include a description, a confidence score, and other metadata such as color, texture, etc., of the detected object. The confidence score can be a probability value that the object is being classified correctly by the classification engine.

The classification engine can provide the bounding box information for each of the detected objects. Using the bounding box information, the bounding box can be reproduced on the image to approximate the boundary of each detected object for a human viewer to visualize what is being detected by the classification engine. As shown, bounding box 205 is associated with bicycle 115, bounding box 210 is associated with person 120, bounding box 215 is associated with vehicle 135, bounding box 220 is associated with vehicle 145, and bounding box 225 is associated with vehicle 155.

The classification result of the first classification engine provides a good example of why using a single classification engine is insufficient and inaccurate. Although the first classification may correctly identify vehicles 135, 145, and 155, it fails to detect automobiles that are partially blocked from view such as truck 110, vehicle 130, vehicle 140, and vehicle 150 (see FIG. 1). The first classification engine also fails to detect truck 105 and plants 125 (see FIG. 1).

Figure 3:
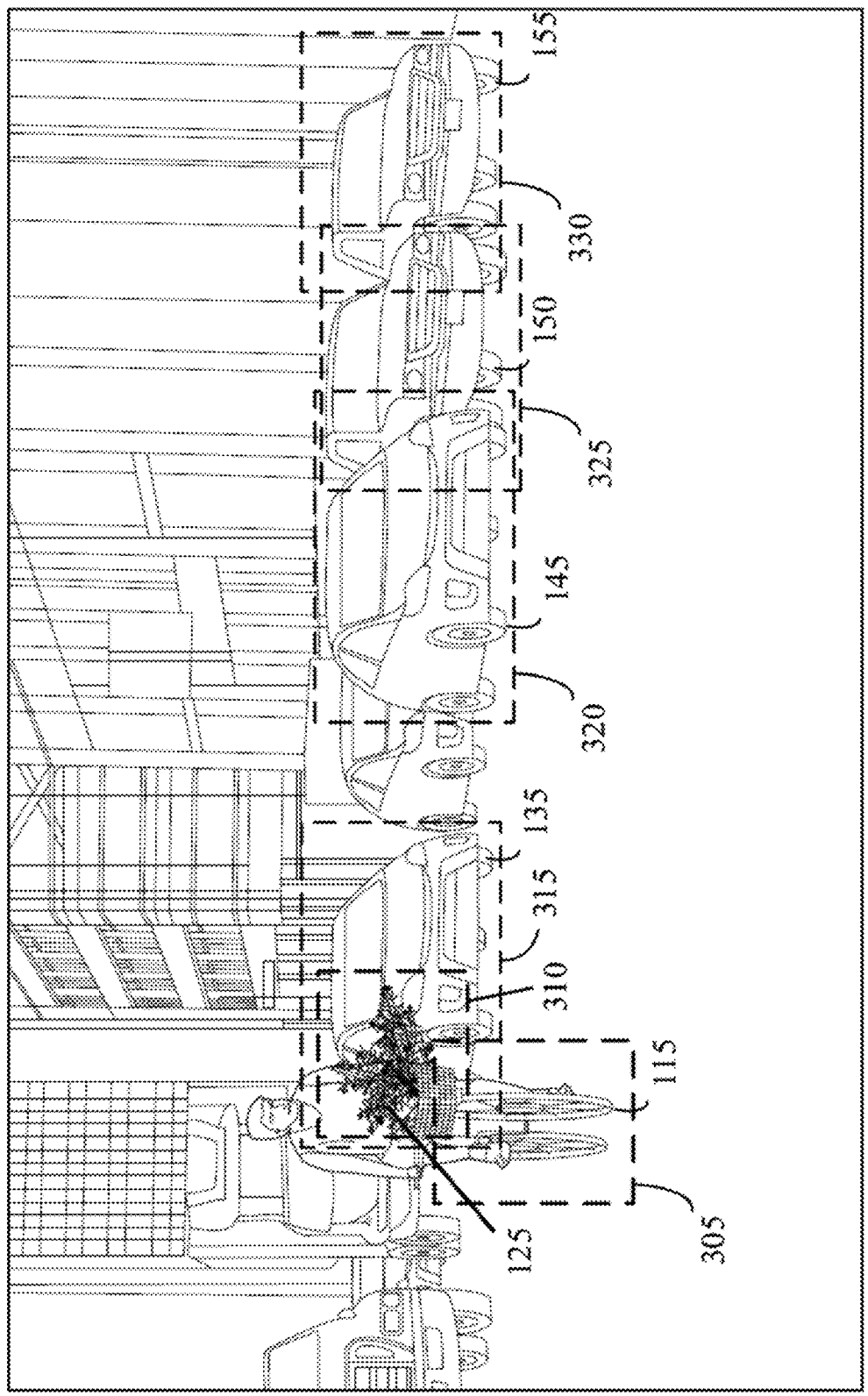

FIG. 3 illustrates an example classification result of image 100 received from a second classification engine, which detected and identified plant 125 and vehicles 135, 145, 150, and 155. Similar to the classification result of the first classification engine, the classification result of the second classification engine can include a boundary information, a description, a confidence score, and other metadata of each detected object. As with most classification engines, the second classification has weaknesses and does not perform well in certain conditions. For example, the second classification engine did not detect truck 105, truck 110, bike 115, person 120, and vehicles 130 and 140 (see FIG. 1). However, the second classification engine is able to correctly identify plant 125 where the first classification engine failed.

Figure 4:
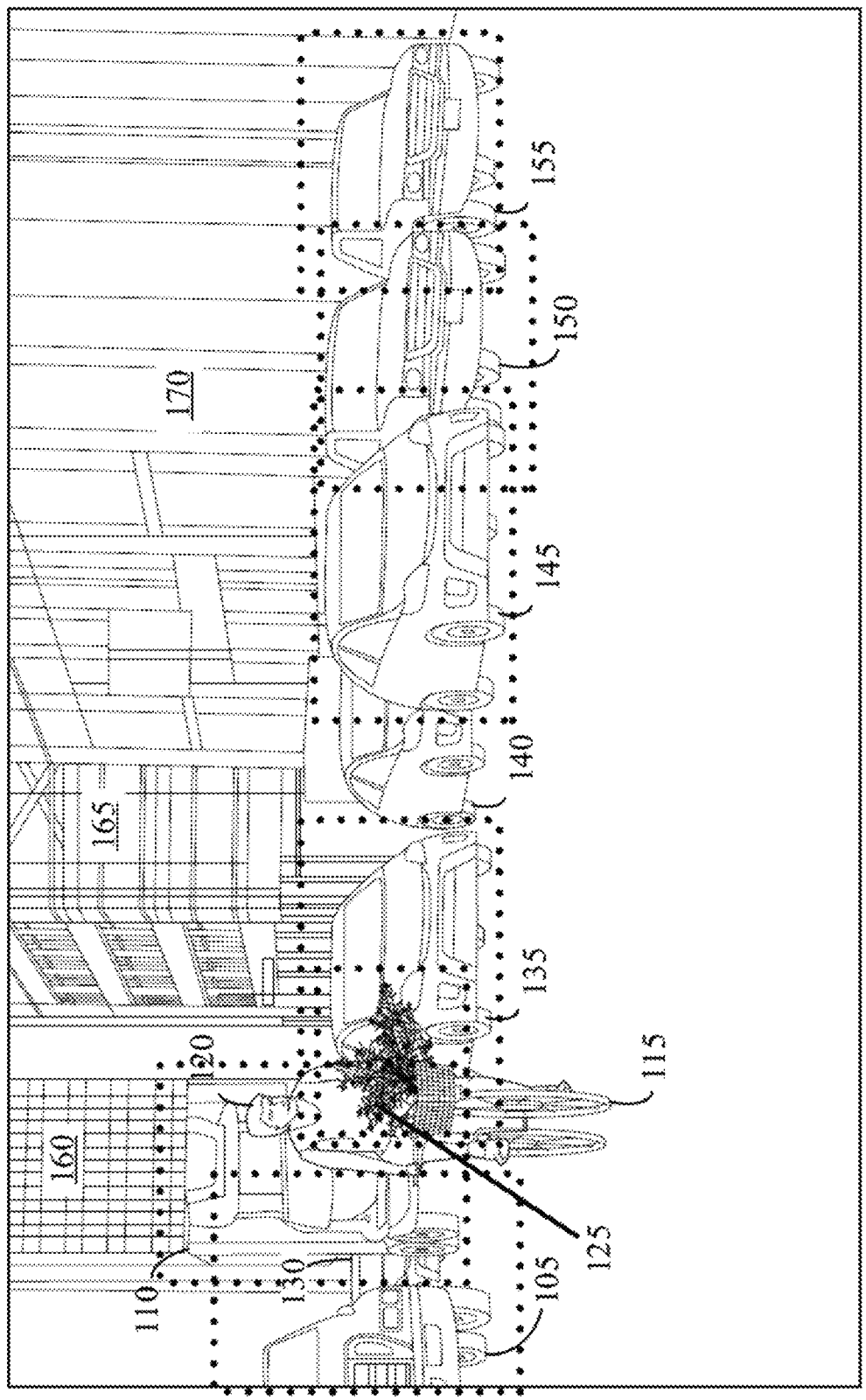

FIG. 4 illustrates an example classification result of image 100 received from a third classification engine, which detected and truck 105, truck 110, bicycle 115, plant 125, vehicles 135, 145, 150, and 155. Although the third classification engine performed the best between the first, second, and third classification engines, it still did not properly detect vehicle 130, person 120, and vehicle 140.

To achieve the best classification result possible, the object classification process, as disclosed herein, automatically aggregates the classification results from all of the three classification engines to generate an orchestrated classification based at least on a set of rules such as, but not limited to, a total certainty score generated for each object detected by all of the engines. The total certainty score can be based on one or more of the number of instances an object is detected by the classification engines, the highest confidence score for each object among all confidence scores received from the classification engines, and the overall probability of accuracy of each detected object based on results from all classification engines. Additionally, although only three classification engines are shown (to simplify the discussion), the object classification process can use any number of classification engines (e.g., 1-1000). It should be noted that a confidence score can be a probability of accuracy (e.g., a percentage probability value of 85%).

The object classification process, as disclosed herein, can automatically aggregate the classification results from the first, second, and third classification engines to properly detect and identify almost all of the objects in image 100. For instance, the orchestrated classification result can detect and identify truck 105, truck 110, person 120, plants 125, vehicle 135, vehicle 145, vehicle 150, and vehicle 155. Although the orchestrated classification result may miss a couple of objects like such as vehicles 130 and 140, the orchestrated classification result is better and more accurate than any of the classification result generated by any single classification engine (i.e., first, second, or third classification engine). Further, the orchestrated classification result can yield a higher probability of accuracy for each of the detected object due to the implementation of the total certainty score.

Further, the disclosed object classification process can generate the orchestrated classification result in a very efficient and cost-effective manner as compared to manually comparing classification results from various engines and then manually merging the classification results. The disclosed object classification process does more than merely automating the comparison process of two different classification results and merging them. It uses pre-established rules to calculate the total certainly score for each object being classified by multiple classification engines, which is then used to determine whether to include each object in the final orchestrated classification result. For example, the total certainly score can be based at least on the overall probability that an object is detected and identified correctly by each of the engines that have identified it. Additionally, the orchestrated classification result takes advantages of the strengths of each classification engine while also eliminating some weaknesses by omitting classification results with a low level of confidence received from each classification engine.

For example, in addition to detecting objects in image 100, each classification engine can be asked to identify the vehicle and the types (e.g., sedan, coupe, brand, and model). Referring to FIG. 1, vehicle 135 actual type can be a four-door hatchback, Toyota Prius. The first classification engine properly detected vehicle 135 and identified it as a 4-door hatchback, Toyota Prius with a confidence of accuracy of 81%. The second classification engine identified vehicle 135 as a 4-door sedan, Honda Civic, with a confidence of accuracy of 65%. The third classification engine identified vehicle 135 as a 4-door hatchback, Toyota Prius, with a confidence of accuracy of 75%. Based on these classification results, the disclosed object classification process can calculate the total certainty score for vehicle 135.

In some embodiments, the overall certainly score could simply be the number of instances vehicle 135 is identified as a 4-door sedan or a 4-door hatchback. Based on this rule, vehicle 135 can be classified as a 4-door hatchback. However, if there is a fourth classification engine indicating that vehicle 135 is a 4-door sedan, this mode of computing the overall certainty score can lead to a tie and an inconclusive result. Accordingly, the overall certainty score can be based at least on the combined overall probability from all engines that detected vehicle 135. Per this rule of computing the overall certainly score, vehicle 135 can be classified as a 4-door hatchback, Toyota Prius even if there are three classification engines identifying vehicle 135 as a 4-door sedan, Honda Civic—each with a low confidence of accuracy value as compared to the confidence of accuracy value indicating vehicle 135 as a Toyota Prius.

Figure 5:
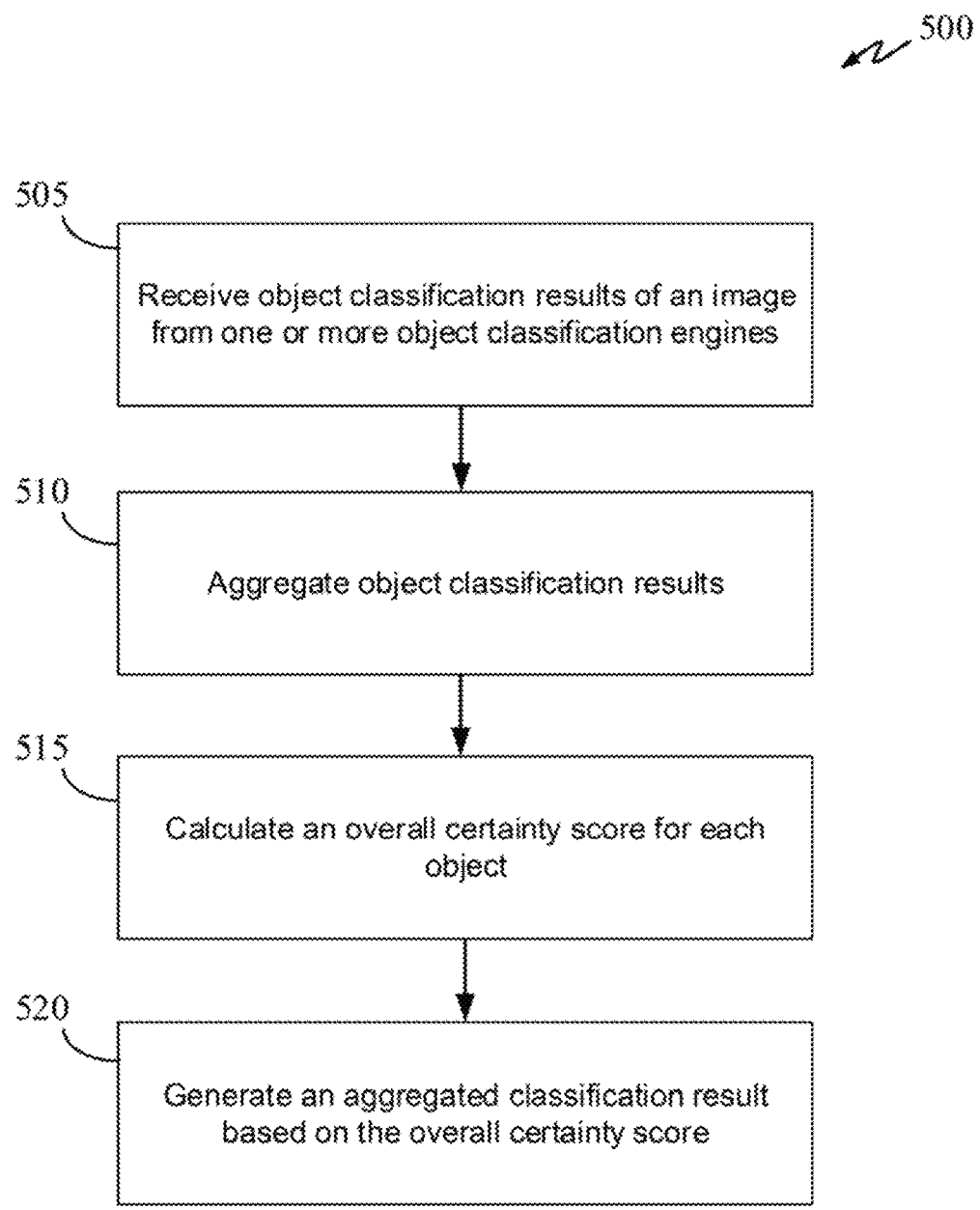
FIG. 5 is a flow diagram of an object classification process in accordance with some embodiments of the present disclosure.

FIG. 5 illustrates a process 500 for object classification using engines orchestration in accordance with some embodiments of the present disclosure. Process 500 starts at stage 505 where the object classification results of an image (e.g., image 100) from one or more object classification engines are received in response to a request to analyze the image. At stage 510, the object classification results received from the one or more objection classification engines are aggregated. In some embodiments, all of the classification results are aggregated into a matrix. Referring to FIG. 6, which illustrates a result matrix (e.g., table) 600 containing the orchestrated classification results from all classification engines involved in object classification process 500 in accordance with some embodiments of the present disclosure. FIGS. 5 and 6 will be discussed concurrently. Result matrix 600 can include the following columns: "Engine," "Bounding Box Location," "Class Description," "Sub-Class1 Description," "Sub-Class2 Description," "Sub-Class3 Description," "Percent Confidence of the Class Description," and "Percent Confidence of the Sub-Class1 Description."

The "Engine" column provides which engine a set of data came from. The "Bounding Box Location" column identifies the location of an object detected by the engine. The bounding box location data are generally pixel coordinates of the lower-left and upper-right corners of a rectangle. The bounding box location data can be used to verify the accuracy of the detected object during a ground truth process, and to compare results from other engines.

The "Class Description" column provides the classification of the detected object within the associated bounding box. The "Sub-Class1 Description" column provides the next level of classification of the object. For example, if the object is identified as a car in the class description, the sub-class identifies the type (e.g., kind) of car (e.g., sedan, coupe, hatchback, etc.). The "Sub-Class2 Description" and "Sub-Class3 Description) columns further provide additional classification information of the detected object where available. In the example of a vehicle, "Sub-Class2" can be the make and model of the vehicle, and "Sub-Class3" can be the color of the vehicle.

The "Percent Confidence—Classification Description" column provides the confidence of accuracy of an engine (e.g., the first engine) for the "Class Description" it provided. For example, a confidence of accuracy value of 85% means the engine is 85% certain that the classification result provided is accurate. Similarly, the "Percent Confidence—Sub-Class1" column provides the confidence of accuracy of an engine (e.g., the first engine) for the "Sub-Class1" description it provided. For example, a confidence of accuracy value of 85% means the engine is 85% certain that the classification result provided is accurate.

The "Object" column can be generated by process 500 in stage 510 based on one or more data from the bounding box column and the class description column. Process 500 can compare the bounding box data of each object received from each engine. If the boundaries of two bounding boxes (from two different engines) are reasonably in the same area of image 100, then the detected objects by the two different engines will be flagged as the same object in image 100. In this way, the classification results can be aggregated for further analysis.

At stage 515, the overall certainty score of each detected object is calculated. In some embodiments, the over certainty score can be the number of instances an object is detected by various classification engines. For example, the overall certainty score can be set to very high if 9 out of 10 engines detected the same object. Contrarily, if 1 out of 10 engines detected the object, then the overall certainty score can be set to a low or medium level. The overall certainty score can also be the average of the probability of accuracy (e.g., confidence of accuracy) from all classification engines. The overall certainty score can be the highest probability of accuracy value from all probability of accuracy values received from various classification engines. The overall certainty score can be the average of two or more of the highest probability accurate values received from various classification engines. The overall certainty score can be the average of probability accurate values above a predetermined threshold (e.g., above 65%). The overall certainty score can be generated using a combination of statistics such as, but not limited, the number of instances the object is identified by all classification engines, the highest probability value, or the average probability value, etc.

FIGS. 7A and 7B illustrate aggregated tables 700 and 750 that can be generated at stage 515 in accordance with some embodiments of the present invention. Both aggregated tables 700 and 750 include classification statistics generated using classification results from all classification engines (e.g., first, second, and third classification engines). Although tables 700 and 750 are generated using classification results from three classification engines, any number of classification engines can be used such as 2, 5, 10, or 100. As shown, tables 700 and 750 include the following columns: "Number of Instances,", "Highest Probability," "Average Probability," and "Overall Probability." The number of instances column indicates the number of times an object is detected by all classification engines (e.g., the one or more classification engines at stage 505). For example, in table 700, vehicle 135 was detected and classified by the first, second, and third classification engines. Accordingly, the number of instances is appropriately assigned as 3 (see box 705). Each engine provided a probability of accuracy value (e.g., confidence of accuracy value), the highest probability of accuracy for vehicle 135 came from the first engine at 81% (see box 710). Box 715 indicates the average probably of all three probability of accuracy values received from the first, second, and third engines.

The overall probability column can be dynamic, and its mode of calculation can be changed based on the type of image being process or classification engines used. In some embodiments, the overall probability can be the average of all probability of accuracy values higher than a certain threshold (e.g., 60%), and where the number of instances of classification engines having probability of accuracy over the threshold exceeds the number of instances of classification engines having probability of accuracy under the threshold. In this way, a classification result with a very low confidence score does not negatively skew the result. Box 720 of table 700 is calculated using the average of all probability of accuracy values over 60%. For object with only 1 instance of detection, the highest, average, and the overall probability of accuracy values are the same.

Table 700 of FIG. 7A includes classification statistics for the "Class Description" column of result matrix 600. Table 750 includes classification statistics for the "Sub-Class1 Description" column of result matrix 600. The overall certainty score at stage 515 can be determined using one or more of the statistics in table 700 and/or table 750. In some embodiments, the over certainty score can be determined using only the "Number of Instances" column, the "Highest Probability" column, or the "Overall Probability" column. In some embodiments, the over certainty score can be a combination of the "Number of Instances" column, the "Highest Probability" column, and the "Overall Probability" column.

At stage 520, an orchestrated classification result is generated based on the overall certainty score of each object, which can be one or more of the statistics on tables 700 and 750. For example, an object of image 100 can be included in the orchestrated classification result based solely on the number of instances that the object was detected and classified by various classification engines. For instance, if ten classification engines were used to analyze image 100, and if the number of instances is seven for a given object—regardless of the values of the probability of accuracy provided by the seven classification engines—then the classification of that object can be assumed to be accurate, and thus will be included in the orchestrated classification results. It should be noted that each instance of detection is from a different classification engine—no two instances of classification are from the same engine.

Referring to row 725 of table 700, the classification of vehicle 110 can be assumed to be accurate—even though the number of instances is only one—because the highest probability value from the classification engine is high. In this case, box 730 indicates that the level of confidence that vehicle 110 is classified correctly by the third engine is 87%. Typically, a confidence of accuracy of 70% or more is considered good, and a 60% confidence of accuracy is acceptable if more than one engines detected and classified the same object.

Referring to FIG. 7B, table 750 aggregates the classification results from all engines that provided a sub-class description in addition to a class description of the object. A sub-class description provides further description of the class. For example, a class can be a vehicle, a flower, an animal, etc. A sub-class can be the type of vehicle, the type of flower, etc. A second level of sub-class can also be provided which could classify the color, size, shape, etc. of an object.

FIG. 8 illustrates a table 800 that compares the performance of each engine and the orchestrated result with the ground truth data of image 100. The overall detection rate of the first, second, and third engines is 45%, 55%, and 64%, respectively. However, using object classification process 500, the orchestrated classification result was able to achieve an overall detection rate of 82%. Additionally, the orchestrated result also has a higher overall confidence of accuracy for the detected objects than any single engine by itself. This is because the orchestrated process (e.g., process 500) can pick and choose classification results that have high confidences of accuracy and ignore classification results with low confidences of accuracy.

Figure 9:
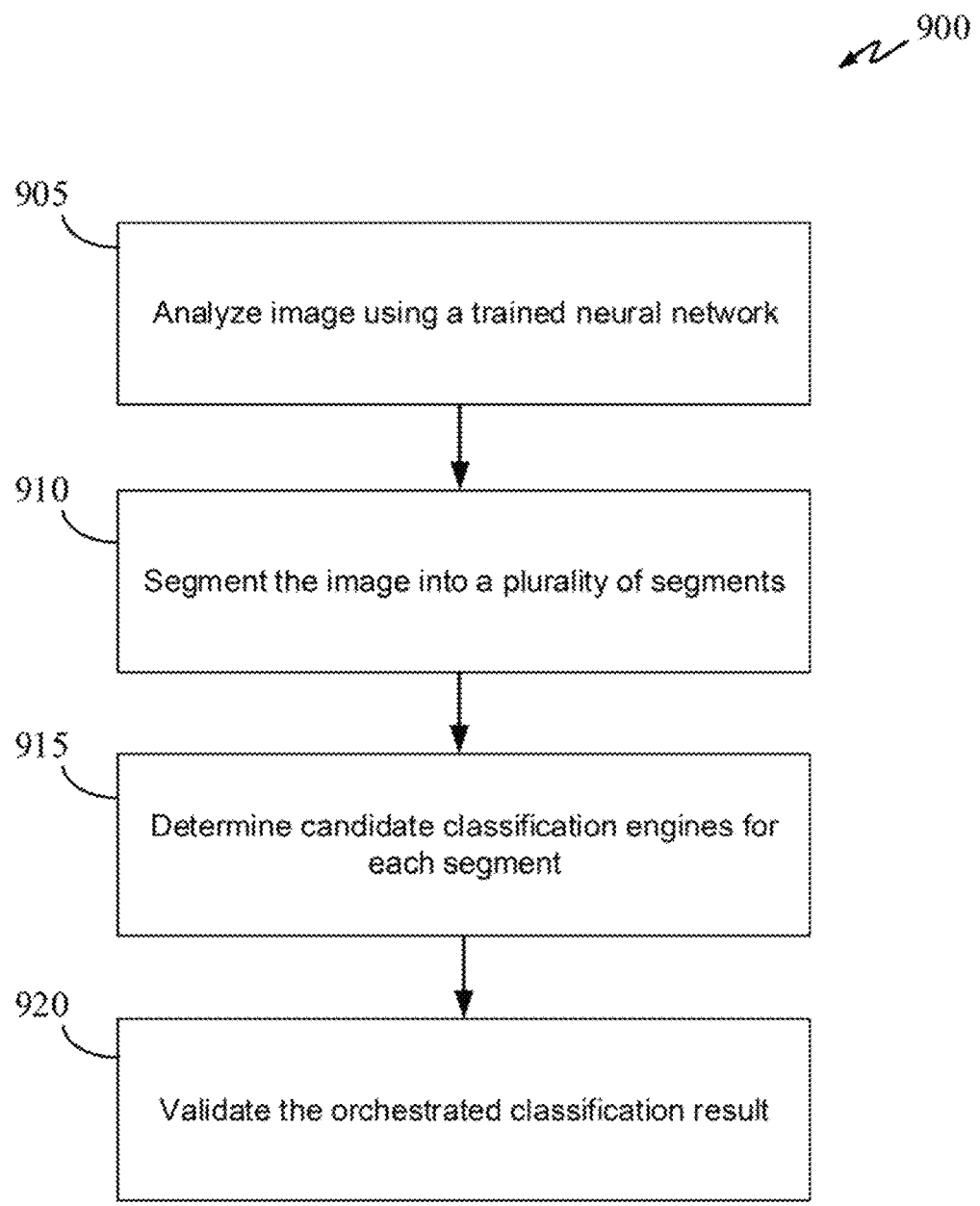
FIG. 9 is a flow diagram of an object classification process in accordance with some embodiments of the present disclosure.

FIG. 9 illustrates a process 900 for object classification in accordance with some embodiments of the present disclosure. Process 900 starts at stage 905 where an image (e.g., image 100) is analyzed using a trained neural network. The trained neural network is trained using training data set that comprise images having ground truth data and classification results from many different classification engines. The neural network can be trained to identify outlines of objects in the image. The neural network can also be trained to predict which classification engine(s) is better at classifying certain images or certain objects of the images. Additionally, the neural network can be trained to predict which classification engine(s) is not good at classifying certain of images (e.g., noisy, low resolution, high light intensity, etc.).

At stage 910, the image is segmented into a plurality of segments, each segment can be a portion of the image where an object is present. In some embodiments, each segment can be represented by a boundary box on the image. The boundary box can be a rectangular box, an oval, a square, or other type of polygons. At stage 915, one or more candidate classification engines is determined for each segment. A candidate classification engine is a classification engine that is predicted to yield a high level of accuracy in classifying one or more objects of a segment or segments based at least on one or more attributes of each segment. One or more attributes of a segment can be annotation data (e.g., red car) and/or pixel data.

At stage 920, the orchestrated result of table 800 can be validated using one or more classification engines in the list of candidate classification engines for each segment. For example, referring to FIG. 6, the first engine classifies person 120 as a person at 87% probability of accuracy. At stage 915, the first engine is determined as one of the candidate engines that can classify a person with very high accuracy. This can validate the orchestrated result shown in FIG. 8 where person 120 is classified as a person. The validation process can also identify false-positive classification. For example, at stage 915, the first engine can be determined to be very bad at classifying a person even if the first engine returned a high probability of accuracy. In this case, the validation process can flag the classification of person 120 as questionable. The validation process can also select another engine that is in the list of candidate engines with high accuracy to classify the object within the boundary box that is supposed to be person 120.

Figure 10:
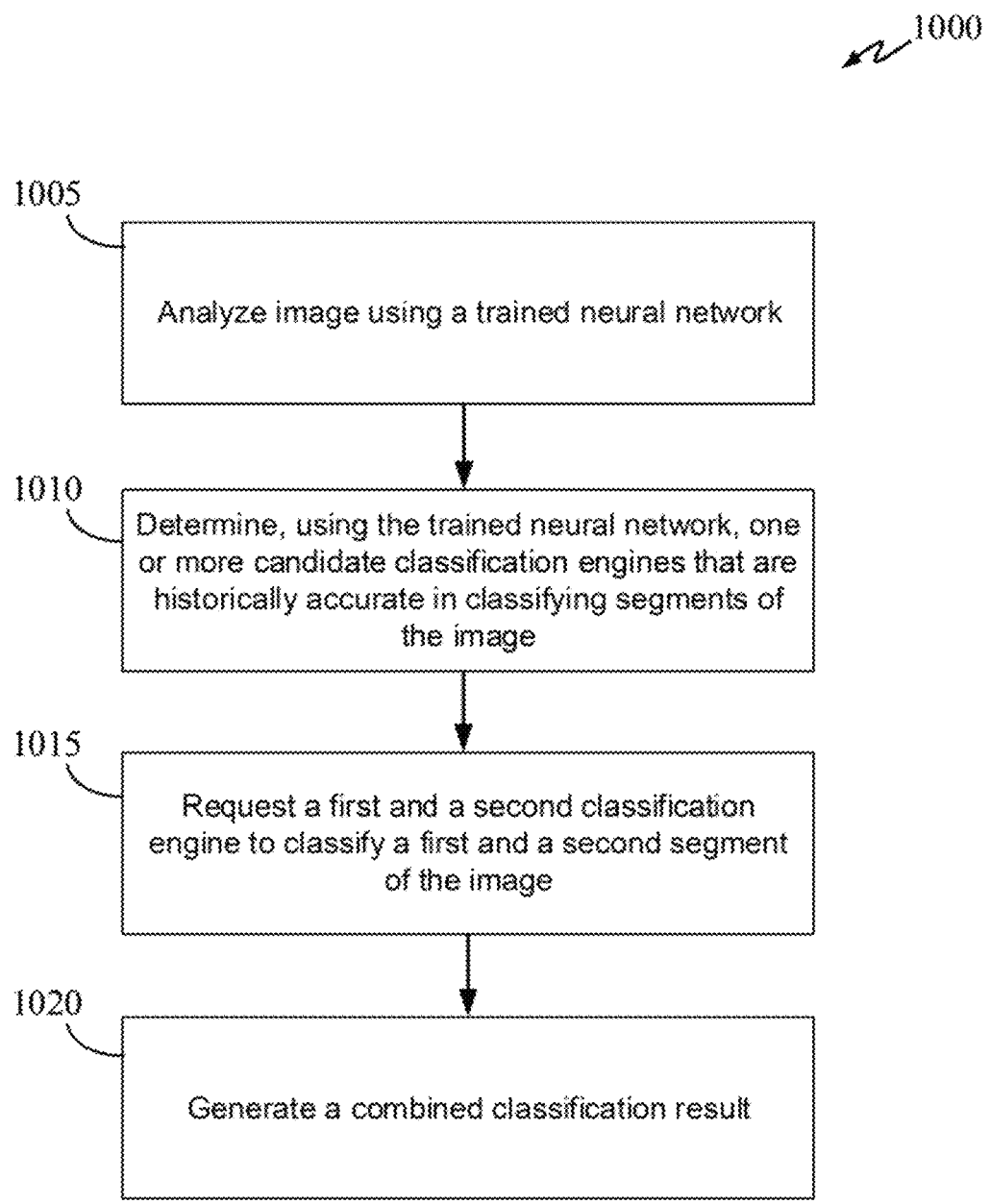
FIG. 10 is a flow diagram of an object classification process in accordance with some embodiments of the present disclosure.

FIG. 10 illustrates a process 1000 for object classification in accordance with some embodiments of the present disclosure. Process 1000 starts at stage 1005 where an image is analyzed by a trained neural network, which has been trained to identify a list of candidate classification engines that can classify objects in an image with a high confidence of accuracy. Each object can have its own list of candidate classification engines, which can be unique, similar, or identical to other lists of other objects. At stage 1005, the trained neural network can detect objects of an image, but not classify them. The classification task will be performed by one of the classification engines in the list of candidate classification engines. It should be noted that the list of candidate classification engines can identify any number of engine, including 1 or more than 1.

At stage 1015, each object in the image (which can be represented by a segment of an image) is then analyzed by an engine in the list of candidate classification engines. For example, assuming there are two objects in the image, a first classification engine (from the list of candidate classification engines for object A) will be requested to analyze object A and a second classification engine (from the list of candidate classification engine for object B) will be requested to analyze object B. It should be noted that the first and second classification engines in the above example can be the same or different classification engines. At stage 1020, an aggregated classification results is generated using classification results from the various classification engines used at stage 1015.

Figure 11:
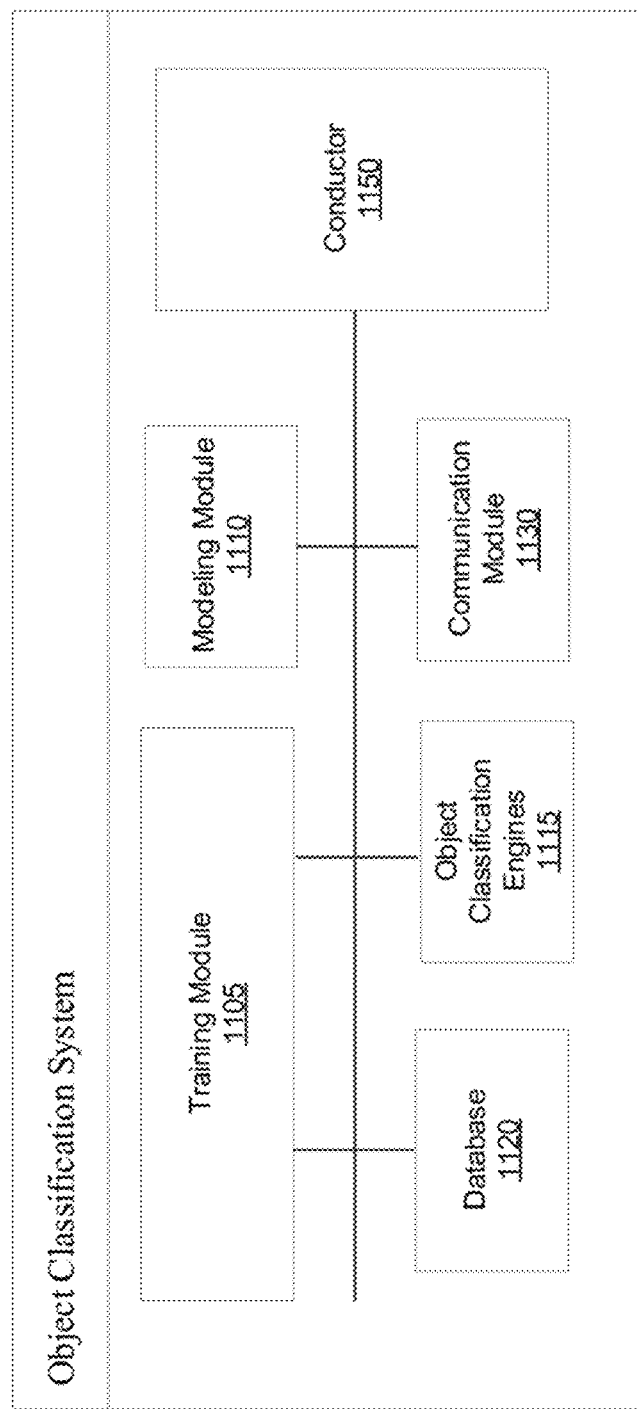
FIG. 11 illustrates a system diagram of the transcription system in accordance with some aspects of the disclosure.

FIG. 11 is a system diagram of an exemplary objection classification system 1100 for optimizing the selection of one or more transcription engines to transcribe a media file in accordance with some embodiments of the present disclosure. System 1100 may include training module 1105, modeling module 1110, object classification engines 1115, database 1120, communication module 1130, and conductor 1150. System 1100 may reside on a single server or may be distributed at various locations on a network. For example, one or more components (e.g., 1105, 1110, 1115, etc.) of system 1100 may be distributed across various locations throughout a network. Each component or module of system 1100 may communicate with each other and with external entities via communication module 1130. Each component or module of system 1100 may include its own sub-communication module to further facilitate with intra and/or inter-system communication.

Training module 1105 includes algorithms and instructions that, when executed by a processor, cause the processor to perform the respective functions and features as describe above and with respect, but not limited, to training related functions of process 900.

Modeling module 1110 includes algorithms and instructions that, when executed by a processor, cause the processor to perform the respective functions and features of the modeling module as describe above with respect, but not limited, to train a neural network model to associate engine performance of an engine to image attributes such as annotation and pixel data. Modeling module 1110 can generate the ranked list of object classification engines based at least on image features of a segment of an image. Modeling module 1110 can implement machine learning algorithm(s) to perform the respective functions and features as described above. Modeling module 1110 can include neural networks such as, but not limited to, a recurrent neural network, a CNN, and a SSD neural network.

Object classification engines 1115 can include local object classification engine(s) and third-party engines such as engines provided by IBM®, Microsoft®, and Nuance®, for example.

Conductor 1150 includes algorithms and instructions that, when executed by a processor, cause the processor to perform the respective the functions and features of the conductor as describe above with respect, but not limited, to FIGS. 1, 2, 3, 4, 5, 6, 7A, 7B, 8, 9, and 10. For example, conductor 1150 includes algorithms and instructions that, when executed by a processor, cause the processor to: receive object classification results of the image from one or more classification engines, the object classification results comprise classification of one or more objects and confidence scores associated with the one or more objects; aggregate the object classification results from the one or more classification engines to generate a list of confidence scores associated with each of the one or more objects, the list of confidence scores comprises one or more confidence scores from one or more classification engines; calculate an overall certainty score for each of the one or more objects based at least on the list of confidence scores; and generate a first orchestrated classification result based the overall certainty score for each of the one or more object.

It should be noted that one or more functions of each of the modules (e.g., 1105, 1110, 1115) in object classification system 1100 can be shared with another modules within system 1100.

Figure 12:
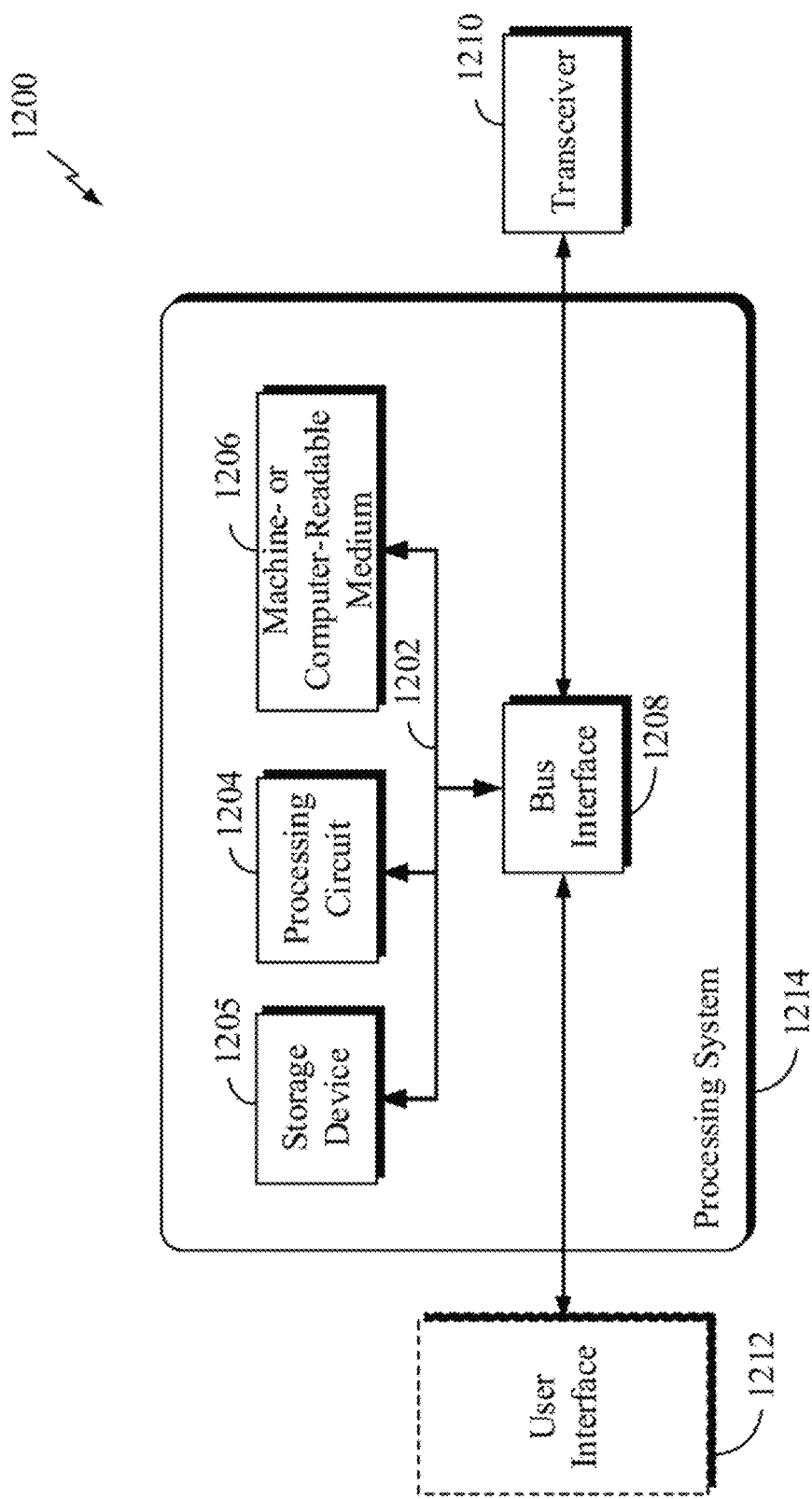
FIG. 12 is a diagram illustrating an exemplary hardware implementation for each of the transcription and the reinforcement learning systems in accordance with some aspects of the disclosure.

FIG. 12 illustrates an exemplary system or apparatus 1200 in which processes and features described in FIGS. 1, 2, 3, 4, 5, 6, 7A, 7B, 8, 9, and 10 can be implemented. In accordance with various aspects of the disclosure, an element, or any portion of an element, or any combination of elements may be implemented with a processing system 1214 that includes one or more processing circuits 1204. Processing circuits 1204 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1204 may be used to implement any one or more of the processes described above and illustrated in FIGS. 1-5, 8, 9, 10, and 11.

In the example of FIG. 12, the processing system 1214 may be implemented with a bus architecture, represented generally by the bus 1202. The bus 1202 may include any number of interconnecting buses and bridges depending on the specific application of the processing system 1214 and the overall design constraints. The bus 1202 may link various circuits including one or more processing circuits (represented generally by the processing circuit 1204), the storage device 1205, and a machine-readable, processor-readable, processing circuit-readable or computer-readable media (represented generally by a non-transitory machine-readable medium 1206). The bus 1202 may also link various other circuits such as, but not limited to, timing sources, peripherals, voltage regulators, and power management circuits, which are well known in the art, and therefore, will not be described any further. The bus interface 1208 may provide an interface between bus 1202 and a transceiver 1210. The transceiver 1210 may provide a means for communicating with various other apparatus over a transmission medium. Depending upon the nature of the apparatus, a user interface 1212 (e.g., keypad, display, speaker, microphone, touchscreen, motion sensor) may also be provided.

The processing circuit 1204 may be responsible for managing the bus 1202 and for general processing, including the execution of software stored on the machine-readable medium 1206. The software, when executed by processing circuit 1204, causes processing system 1214 to perform the various functions described herein for any particular apparatus. Machine-readable medium 1206 may also be used for storing data that is manipulated by processing circuit 1204 when executing software.

One or more processing circuits 1204 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1206. The machine-readable medium 1206 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as, but not limited to, portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1206 may reside in the processing system 1214, external to the processing system 1214, or distributed across multiple entities including the processing system 1214. The machine-readable medium 1206 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The embodiments described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. A method for classification of objects in an image, the method comprising:
    receiving object classification results of the image from one or more classification engines, the object classification results comprise classification of one or more objects and confidence scores associated with the one or more objects;
    aggregating the object classification results from the one or more classification engines to generate a list of confidence scores associated with each of the one or more objects, the list of confidence scores comprises one or more confidence scores from one or more classification engines;
    calculating an overall certainty score for each of the one or more objects based at least on the list of confidence scores;
    prior to receiving object classification results of the image from one or more classification engines, analyzing the image using a trained neural network;
    segmenting, using the trained neural network, the image into a plurality of segments based at least on the analysis of the image;
    determining one or more candidate classification engines that are historically accurate in classifying each of the plurality of segments based on one or more attributes of each respective segment; and
    sending each of the plurality of segments to a respective classification engine determined to have a historically high accuracy above a predetermined threshold for analysis; and
    generating a first orchestrated classification result based the overall certainty score for each of the one or more object.

2. The method of claim 1, wherein the overall certainty score comprises a highest confidence score in the list of confidence scores.

3. The method of claim 1, wherein the overall certainty score comprises a number of instances of confidence scores, in the list of confidence scores, having a score above a threshold.

4. The method of claim 1, wherein the overall certainty score comprises an overall probability of accuracy of the confidence scores in the list of confidence scores.

5. The method of claim 1, further comprising:
    validating the first orchestrated classification result, using a trained neural network; and
    generating a second orchestrated classification result based at least in part on the validation of the first orchestrated classification result.

6. The method of claim 5, wherein the trained neural network is trained to identify one or more candidate classification engines that have a high probability of classifying a segment of an image accurately.

7. The method of claim 6, wherein validating the first orchestrated classification result comprises:
    analyzing the image using the trained neural network;
    segmenting the image into a plurality of segments based at least on the analysis of the image;
    determining one or more candidate classification engines that are historically accurate in classifying each of the plurality of segments based on one or more attributes of each respective segment; and
    validating that the overall certainty score for each of the one or more objects is based on one or more classification engines having historically high accuracy.

8. The method of claim 7, wherein validating the first orchestrated classification result comprises modifying the first orchestrated classification result to generate the second orchestrated classification result based at least on validating that the overall certainty score for each of the one or more objects is based on one or more classification engines having historically high accuracy.

9. A system for classifying objects of an image, the system comprising:
  a memory;
  one or more processors coupled to the memory, the one or more processors configured to:
    segment the image into a plurality of segments based at least on the analysis of the image;
    determine one or more candidate classification engines that are historically accurate in classifying each of the plurality of segments based on one or more attributes of each respective segment; and
    validate that the overall certainty score for each of the one or more objects is based on one or more classification engines having historically high accuracy generate a first orchestrated classification result based the overall certainty score for each of the one or more object;
    receive object classification results of the image from one or more classification engines, the object classification results comprise classification of one or more objects and confidence scores associated with the one or more objects;
    aggregate the object classification results from the one or more classification engines to generate a list of confidence scores associated with each of the one or more objects, the list of confidence scores comprises one or more confidence scores from one or more classification engines;
    calculate an overall certainty score for each of the one or more objects based at least on the list of confidence scores; and
    generate a first orchestrated classification result based the overall certainty score for each of the one or more object.

10. The system of claim 9, wherein the one or more processors are further configured to:
  prior to receiving object classification results of the image from one or more classification engines, analyze the image using a trained neural network;
  segment, by the trained neural network, the image into a plurality of segments based at least on the analysis of the image;
  determine one or more candidate classification engines that are historically accurate in classifying each of the plurality of segments based on one or more attributes of each respective segment; and
  send each of the plurality of segments to a respective classification engine determined to have a historically high accuracy above a predetermined threshold for analysis.

11. The system of claim 9, wherein the overall certainty score comprises a highest confidence score in the list of confidence scores.

12. The system of claim 9, wherein the overall certainty score comprises a number of instances of confidence scores, in the list of confidence scores, having a score above a threshold.

13. The system of claim 9, wherein the overall certainty score comprises a number of instances of confidence scores, in the list of confidence scores, having a score above a threshold.

14. The system of claim 9, wherein the overall certainty score comprises an overall probability of accuracy of the confidence scores in the list of confidence scores.

15. The system of claim 9, wherein the one or more processors are further configured to:
  validate the first orchestrated classification result, using a trained neural network; and
  generate a second orchestrated classification result based at least in part on the validation of the first orchestrated classification result.

16. The system of claim 15, wherein the one or more processors are further configured to modify the first orchestrated classification result to generate the second orchestrated classification result based at least on validating that the overall certainty score for each of the one or more objects is based on one or more classification engines having historically high accuracy.

* * * * *